United States Patent [19]

Reimann et al.

[11] Patent Number: 4,566,971

[45] Date of Patent: Jan. 28, 1986

[54] PROCESS AND APPARATUS FOR THE BIOLOGICAL PURIFICATION OF WASTEWATER

[75] Inventors: Hans Reimann; Uwe Fuchs, both of Munich, Fed. Rep. of Germany

[73] Assignee: Linde Aktiengesellschaft, Wiesbaden, Fed. Rep. of Germany

[21] Appl. No.: 694,356

[22] Filed: Jan. 24, 1985

Related U.S. Application Data

[63] Continuation-in-part of Ser. No. 418,967, Sep. 16, 1982, abandoned.

[30] Foreign Application Priority Data

Sep. 17, 1981 [DE] Fed. Rep. of Germany ....... 3137055

[51] Int. Cl.[4] ................................................ C02F 3/08
[52] U.S. Cl. .................................... 210/616; 210/151; 210/627
[58] Field of Search ............... 210/616, 631, 617, 618, 210/626–628, 150, 151

[56] References Cited

U.S. PATENT DOCUMENTS

| | | | |
|---|---|---|---|
| 2,071,591 | 2/1937 | Tholin | 210/616 |
| 3,779,906 | 12/1973 | Levin | 210/616 |
| 4,055,490 | 10/1977 | Hasegawa et al. | 210/151 |
| 4,200,524 | 4/1980 | Levin | 210/618 |

FOREIGN PATENT DOCUMENTS

| | | | |
|---|---|---|---|
| 761830 | 7/1971 | Belgium | 210/150 |
| 49-64621 | 6/1974 | Japan | 210/616 |
| 54-24455 | 2/1979 | Japan | 210/616 |
| 54-38657 | 3/1979 | Japan | 210/618 |

*Primary Examiner*—Benoit Castel
*Attorney, Agent, or Firm*—Millen & White

[57] ABSTRACT

In the biological purification of wastewater containing organic impurites, wherein the wastewater is passed through a reaction (1), e.g., continuous flow-stirred tank having circulating means (12) to achieve thorough mixing therein, or a fluidized bed or suspended bed type reactor, the wastewater is aerated in the presence of activated sludge with an oxygen containing gas fed through a gas feed conduit (9), and in a post clarification stage (5), the wastewater-activated sludge mixture from the reactor (1) is separated into purified water and sludge, the improvement comprises conducting the biological purification in the reactor (1) in the presence of a carrier material for microorganisms. The carrier material comprises particles of macroporous material having a low specific gravity, and in piece and/or granulated form in an amount such that the suspended individual particles are freely movable in the wastewater. Soft polyurethane foam particles are especially preferred as the carrier materail. In addition, a predetermined free activated sludge is maintained in the reactor.

13 Claims, 1 Drawing Figure

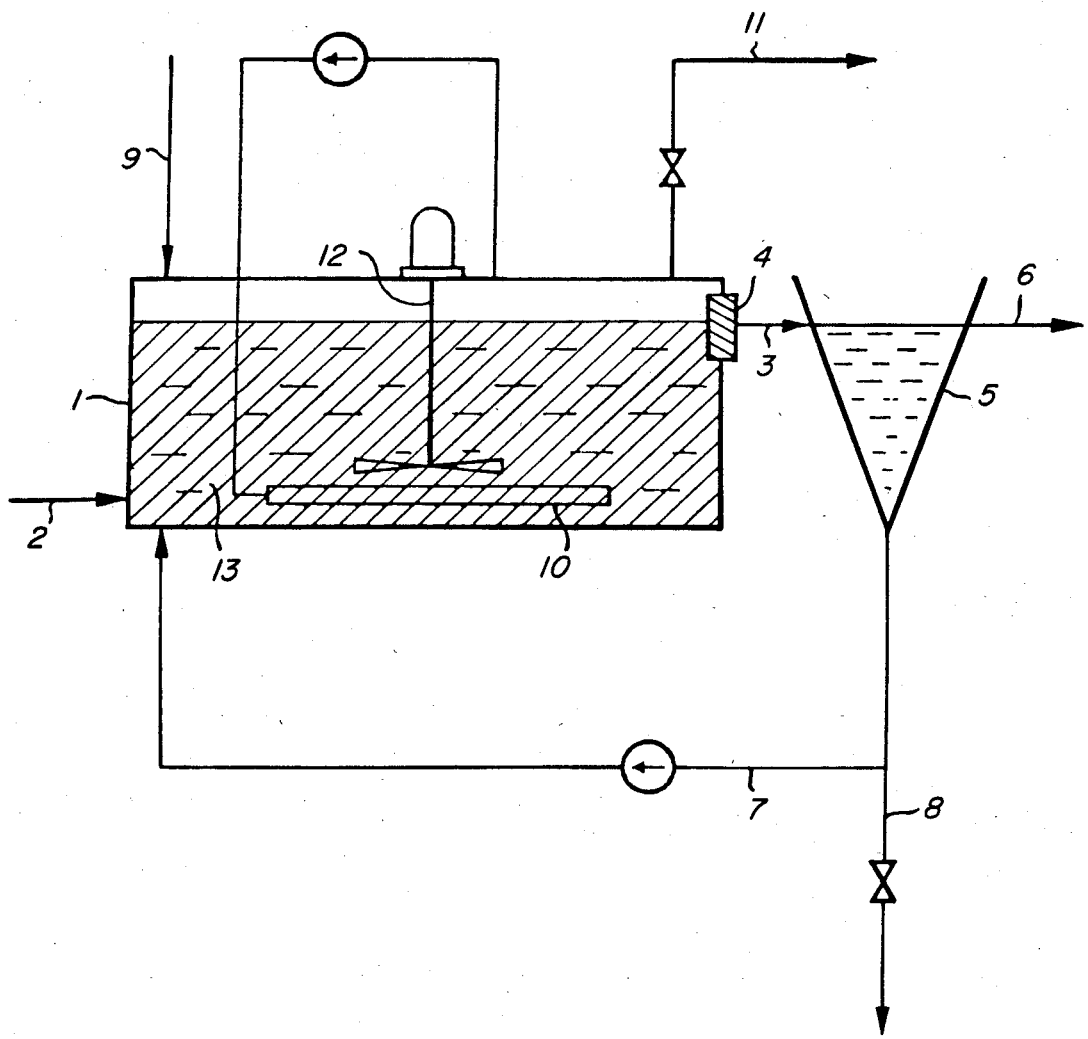

PROCESS AND APPARATUS FOR THE BIOLOGICAL PURIFICATION OF WASTEWATER

CROSS REFERENCE TO RELATED APPLICATION

This application is a continuation-in-part application of abandoned application Ser. No. 418,967 filed Sept. 16, 1982, and whose disclosure is specifically incorporated by reference herein.

BACKGROUND OF THE INVENTION

This invention relates to a process for the biological purification of wastewater containing organic impurities, wherein the wastewater is aerated in a reactor, in the presence of activated sludge, with a gas containing molecular oxygen, e.g., air and/or pure oxygen, and thereafter, the wastewater-activated sludge mixture is separated into purified water and settled sludge. The invention also relates to an apparatus for conducting the process.

In conventional activated sludge processes, wastewater to be treated is fed into and mixed with activated sludge in a reactor designed as a continuous flow-stirred tank. Simultaneous to this feed and mixing, oxygen is introduced into the reactor to meet the oxygen demand requirements of the aerobic microorganisms in the activated sludge. As a result of the activity of these aerobic microorganisms, the organic contaminants of the wastewater, present in dissolved or colloidal form, are partially converted into bacterial substance and partially reacted, by means of oxygen, essentially into $CO_2$ and water. Subsequently, the activated sludge is, in most cases, separated in a separator from purified wastewater by settling in a post clarification stage arranged downstream of the oxygenation tank. At least a portion of the sludge settled in the post clarification stage is recycled as recycle sludge into the oxygenation tank to maintain a desired minimum sludge concentration in said reactor.

In order to achieve adequate purification of the wastewater, it is necessary, in accordance with the prior art process, to maintain as high a sludge concentration in the oxygenation tank as technically feasible. However, due to the limited thickening, i.e., due to the settling characteristics of the biological floc, of the activated sludge, sludge concentrations of only at most 2-5 g/l can be obtained in the conventional oxygenation tanks. As a result, it is necessary that a correspondingly large amount of recycle sludge must be recycled into the oxygenation tank, resulting in high energy consumption for pumping. Furthermore, with a high sludge concentration in the oxygenation tank, the load in the post clarification stage is correspondingly high, so the post clarification tanks must be made of relatively large dimensions.

As an alternative, U.S. Pat. No. 4,419,243 discloses using reticulated carrier particles forming a skeleton for an integral mass of biomass growth to increase the concentration in a reactor. Excess biomass growing out from the skeletal structure is shed by abrasion between the carrier particles resulting in a small amount of free sludge in the wastewater. Typically this amount is on the order of only about 200 mg/l in the case of a typical municipal wastewater inflow having a BOD of about 400 mg/l. This presents problems inasmuch as due to the small amount of unfixed sludge, conventional secondary settling tanks cannot be employed because insufficient flocculation is achieved. This is further complicated by the requirement therein that in operation, the time of the carrier in the reactor must be calculated so that they are removed at the time the biomass begins to grow on the outside surface of the carriers and break off.

SUMMARY OF THE INVENTION

This invention has as an object providing an improved process of the aforementioned type, as well as the apparatus for conducting such a process, whereby high purification of, in particular, highly polluted wastewaters can be attained in a simple and economical fashion.

Upon further study of the specification and appended claims, further objects and advantages of this invention will become apparent to those skilled in the art.

These objects are achieved according to this invention in part by introducing into the reactor a carrier material for the microorganisms. The carrier material comprises macroporous matter particles having a low specific gravity, preferably 10 to 200 kg/m$^3$, and more preferably 20–100 kg/m$^3$. The preferred carrier material is in piece and/or granulated and/or sintered form, and in such a quantity that the individual particles float freely in the wastewater. By piece form is meant that the carrier material has the form of spheres, cubes or of any given form. By granulated form is meant that the carrier material is in the form of porous grains with a diameter of 1–5 mm.

The particles are most preferably of an open-cell structure as opposed to closed cell or reticular. By sintered form is meant that little pieces of the carrier material are joined together to greater pieces by a thermal treatment. By open cell is meant a material having the cell membranes ruptured but with a certain portion of the cell walls still present in the foam plastic framework. This forms a multiple branch and angular canal system whose cross-section is determined by the pore size. Furthermore, by float freely is meant that the particles are suspended and freely moving in any direction in the bulk liquid.

The use of open-cell macroporous matter particles having a low specific gravity as the carrier material for the microorganisms provides a large active surface area for settling of the microorganisms thereon. Due to the macropores of the matter particles, the bacteria are forced into a decentralized growth mode whereby a substantially large mass transfer surface area results as compared to conventional flocculent activated sludge. The macropores of the material are preferably 0.1 to 3 mm, more preferably, 0.5 to 2 mm, and in the case of heavily charged reactors, i.e., those with a high BOD, and most preferably 1.2–1.8 mm. Furthermore, the volume of the particles is preferably 0.1 to 125 cm$^3$, more preferably 1 to 20 cm$^3$. These volume values largely are consistant with diameter values of the particles of 5 to 50 mm, especially by a cubic form of the particles. As another characteristic, the particles can be made of soft polyurethane foam. By soft polyurethane foam is meant a highly flexible and compressible material. Polyethylene is also highly desirable as a material for use since it is physiologically safe and highly abrasion resistant. Other materials capable of being used in the invention include urea formaldehyde resins and/or polypropylene and/or siliconpolymers in a foamed or sintered state.

As a result of the use of these carriers, the microorganisms feeding on the contents of the wastewater which are firmly settled and attached within the pores and in the interior of the particles, can be readily retained in the reactor, and a very high concentration of total solids can be maintained in the reactor with maximum values of above 15 g/l, and normally in the range of 6 to 15 g/l; a value significantly higher than the solids concentrations achieved in conventional activated sludge processes.

In addition to the above, it has also been surprisingly discovered that it is highly desirable to maintain a minimum amount of free activated sludge with the carried sludge in the reactor, i.e., activated sludge not fixed on the support particles. The recycling of sludge from a subsequently arranged settling stage should be such that about 0.9–9 kg/m$^3$, preferably 3–6 kg/m$^3$ of free activated sludge is maintained in the reactor. Accordingly, this amount of free activated sludge coupled with the sludge fixed in the carrier, to be discussed hereinafter, permits achieving a high degree of BOD degradation in a short time. More particularly with such an amount of free activated sludge, a high rate of degradation can be achieved, i.e., 90% BOD$_5$ reduction within, e.g., one hour, as compared to the prior art carrier employing processes which achieve only about 85% BOD$_5$ reduction in 3 hours.

In the presence of the free activated sludge, the share of fixed biomass and thus the reaction rate can be kept very high since microorganisms are continuously available to colonize on the carrier particles from the free sludge at all times. The free sludge does not include filamentous microorganisms since the rate of oxygen consumption of the carrier biomass is greater than in the free activated sludge due to the increased concentration of the fixed biomass.

In addition to providing an additional source of biomass, the free activated sludge also acts as a lubricant between the individual support particles. This reduces abrasion between the particles themselves and the particles and the wall. As a result, colonization surface area can be maintained constant over long periods of time, especially when employing polyethylene carrier particles which are highly resistant to abrasion.

In order to maintain the necessary amount of free activated sludge discussed above, the recycle from a secondary clarification stage is adjusted accordingly. Thus, a very high loading capacity with the wastewater is achieved. Expressed conversely, a short residence time of the wastewater in the reactor is achieved, in conjunction with a savings in reactor volume. As a result of the possibility of retaining a high concentration of biomass in the reactor due to the combined carried and free activated sludge, the requirement for large post clarification tanks, as required in the prior art activated sludge processes is eliminated in spite of the high solids concentration in the reactor. Instead, due to the lower sludge volume resulting from the relatively lower quantity of unfixed biomass passing to the settling stage, it is possible to reduce the post clarification tank volume, i.e., size, as compared with the volume necessary in conventional oxygenation, i.e., aerated suspended activated sludge, processes. Moreover, the high solids concentration as a result of the high concentration on the carrier, as well as the amount of free sludge, makes it possible to relatively reduce the sludge-recycle ratio, i.e., recycle, leading to a savings in pumping energy expended to convey the recycle sludge. This is in comparison with conventional suspended, i.e., non-carrier, activated sludge processes.

A high mass transfer is ensured by providing that the suspended individual carrier particles are freely movable in the wastewater. The free distribution of the carrier particles is enhanced by their low specific gravity, preferably being 10 to 200 kg/m$^3$, and more preferably 20 to 100 kg/m$^3$, as well as by providing a gaseous or liquid stream in counterflow to any sinking movement of carrier particles. To achieve the described distribution, the oxygen-containing gas, in the form of air and/or industrial oxygen, required for feeding the microorganisms, can be introduced at the bottom of the reactor, for example, by means of a conventional fine-, medium-, or coarse-sparging device. By fine-, medium-, or coarse-sparging devices is meant that with the sparging device gas bubbles with respective diameters of 0.1 to 1.5 mm, 1.5 to 3 mm and above 3 mm can be produced.

As to the carrier particles themselves, it is preferred that the particles have a water absorption capacity of about 30–70% after two minutes, and more preferably 50–70% after two minutes.

The pore density of the carrier is about 6–30 pores/cm, and more preferably 10–20 pores/cm. As noted previously, although the pore size is preferred to be about 0.1–3 mm, in the case of high BOD$_5$ volume loads, the pore size is most preferably about 1.2–1.8 mm. By high BOD$_5$ volume loads is meant a BOD$_5$ volume load higher than 3 kg/m$^3$. d.

In addition, the air permeability of the carrier particles is 150 to 350 l/dm$^2$ min. at 10 mm water column differential pressure and 50 mm thickness of the specimen. By l/dm$^2$/min is meant liter per square decimeter per minute.

With these carrier particles, it is also possible in an alternative form to introduce the wastewater to be treated into the bottom of the reactor, in the same manner as the gas, and due to the ensuing turbulence imparted to the individual carrier particles, which turbulence can optionally be further enhanced by recirculating means, an improvement in the mass transfer is attained. A loss in biomass is not a problem because the microorganisms fed by the wastewater ingredients are firmly settled in the pores and in the interior of the individual carrier particles and, because of the lubricating effect of the free activated sludge, are protected from abrasion in the case of mechanical action and/or frictional contact between the individual particles.

In order to not impede the floating motion of the individual carrier particles to any great degree, it is preferable to introduce the particles used as the carrier material in such a quantity into the reactor that it corresponds to a preferred volume proportion of 5 to 40% of the reactor volume, more preferably 20 to 30%. This is for a completely mixed tank or stirred basin type reactor.

Thus, as noted, the reactor can be appropriately operated as a continuous flow-stirred tank with a volume proportion of the matter particles of 5 to 40%, more preferably 20 to 30%. Advantageously, the particles employed as the carrier material have a volume of preferably 0.1 to 125 cm$^3$, more preferably 1 to 20 cm$^3$. The selection of individual carrier particles of this size and characteristics provides stable bacterial colonies and ensures oxygen supply and mass transfer into the interior of each individual carrier particle thereby increasing the specific gravity thereof, once laden with biomass, to slightly above that of the liquid.

As a result of these specific properties of the carrier having open cells, as opposed to being reticulated, a number of advantages result. More particularly, as contrasted to U.S. Pat. No. 4,419,243 which requires periodic cleaning of the reticular carrier because of clogging, in the present invention clogging does not occur. The carrier particles of the invention as used in the process are self-cleaning because of a number of interactions.

These interactions preventing an excess growth of biomass at the inside and the outside of the carrier particles are the result of the open cell structure and of the adjustement of all given parameters of the carrier particles concerning the volume, the pore size, the specific gravity and the amount. The open cell structure with a certain portion of cell walls still present in the foam plastic framework forms a multiple branch and angular canal system whose cross-section is determined by the pore size. The adjustement of the specific gravity, of the volume and of the amount of the carrier particles makes it possible that in cooperation with the gas introduction generating separate zones of ascending and descending water flows the carrier particles ascend and descend in the reactor to zones with different hydrostatic pressure. Because of the changing of hydrostatic pressure the gas contents of the carrier particles are pressed or expanded respectively producing a pumping effect with a suction of waste water into and an ejecting of waste water out of the canal system respectively. In addition to this pumping effect collisions of the carrier particles among one another are given during their movement as a result of which gas bubbles being in the canal system leave the carrier particles. Besides this, protoza in the canal system of the carrier particles in vast numbers consume part of the biomass and by vortex cause a lasting microturbulence which releases parts of the biomass from the carrier. By the interaction of the foregoing proceedings a self-cleaning of the canal system from excess biomass is reached. By the failure of the canal system in carrier particles with a reticular structure gas bubbles, liquids and biomass unprevented can escape or enter the pores of the carrier particles so that the proceedings with respect to the described self-cleaning effect can not be reached.

In addition to the above, if desired, the reaction can be adapted so that anoxic zones can additionally be created in the interior of the carrier material particles by limiting or arranging the concentration of dissolved oxygen in a predetermined manner, or by selecting a diameter for the individual matter particles lying in the upper range of the indicated volumes, e.g., 50 to 125 cm$^3$, so that denitrification reactions can optionally be carried out simultaneous with BOD reduction in the reactor. The indicated size of the individual macropores in the matter particles extensively precludes clogging of the pores by contaminants and makes it possible to offer the microorganisms a large surface area for settlement.

In a preferred embodiment of the process, carrier particles of organic polymer compounds are utilized as the carrier material. In particular, carrier particles of soft polyurethane foam, polyethylene or similar materials having open macropores, as presently produced by the plastics processing industry, provide all aforedescribed properties necessary for a suitable carrier material. It is also possible to utilize as the carrier particles remnants and waste materials available from the plastics processing industry. It has been discovered that soft polyurethane foam particles and polyethylene particles in an amount of about 1 cubic meter are capable of absorbing and binding more than 30 kg of biological solids, so that the concentration of sludge solids in the reactor can attain values of above 15 g/l.

The economies of the process of this invention can be further improved by applying activated carbon to the carrier material before the wastewater is conducted through the reactor. In this manner, with the energy consumption remaining the same for the oxygen introduced, a doubling of the oxygen transfer efficiency can be attained under favorable conditions. This is effected by adsorption/desorption of oxygen by the activated carbon.

In addition, in economical purification of highly polluted wastewaters, the process of this invention can be employed in such wastewater treatment plants which heretofore provided only an incomplete purification capacity as a result of limited capacities, i.e., power, effect. In this connection, it is especially advantageous to introduce into the reactor, as the wastewater to be purified, the effluent from a trickling filter and/or a chemical and/or a physical purification stage. Since the biomass concentration can be kept at a relatively high value in the reactor, i.e., preferably at least 6 g/l, due to the present of the carrier particles and the free activated sludge, a short aeration period is sufficient for treating the effluent from the above-enumerated stages. Furthermore, only a relatively minor TSS-load results in the post clarification stage but which is sufficient to achieve good flocculation and settling due to the amount of free activated sludge.

The apparatus for conducting the process comprises a reactor, i.e., a tank or basin, and a post clarification device, i.e., arranged downstream of the reactor by means of a connecting outlet. According to the invention, the above-discussed macroporous matter particles having a low specific gravity in piece form are freely movably provided within the reactor, i.e., tank, as a carrier material for the microorganisms. To retain the matter particles in the reactor, a separator, for example, a simple screen, is associated with the outlet from the reactor. In addition, when filled with wastewater, the reactor contains a predetermined amount of free activated sludge therein, i.e., non-carrier supported, in addition to the carried biomass.

BRIEF DESCRIPTION OF THE DRAWING

Various other objects, features and attendant advantages of the present invention will be more fully appreciated as the same becomes better understood when considered in connection with the accompanying drawings, in which like reference characters designate the same or similar parts throughout the several views, and wherein:

The figure shows a preferred embodiment of the apparatus for conducting the process of the invention the figure being a schematic view which will be described in greater detail below.

DETAILED DISCUSSION OF THE INVENTION

In the figure, 1 denotes a reactor sealed with respect to the atmosphere and designed as a fully mixed oxygenation tank. As indicated by the shading, macroporous matter particles 13 of soft polyurethane or polyethylene foam having a diameter of 5 to 50 mm, which is largely consistent with a volume value of 0.1 to 125 c$^3$, a specific gravity of 20 to 100 kg/m$^3$, and open macropores typically of 0.1 to 3 mm, are disposed in the oxygenation tank 1 as the carrier material for the microorganisms. These particles 13 are provided in a freely movable fashion in an amount corresponding to a volume proportion of 5 to 40% of the volume of the oxygenation tank.

The wastewater to be treated is introduced into the oxygenation tank 1 through an inlet 2, and the wastewater which has been treated is discharged through an outlet 3 connected in the upper zone of the oxygenation tank 1, typically nearly at the water surface, which outlet is associated with a separator 4 for retaining the individual carrier particles in the tank 1. The separator can be a simple screen, for example, of a conventional nature. The outlet 3 of the oxygenation tank 1 is in communication with a post clarification stage 5, preferably a settling tank wherein any sludge in the treated wastewater settles out, and having a drain 6 for removing purified wastewater from the top, a sludge recycle conduit 7, with a pump for recycling sludge into the oxygenation tank 1, and a sludge discharge conduit 8 for excess sludge which has settled.

In order to supply the microorganisms with oxygen, the provision is made to feed substantially pure oxygen, or at least a gas containing more oxygen than air, typically to 80 percent by weight, through a feed conduit 9 to a gas space underneath the cover of the oxygenation tank 1, and to conduct the gas present in the gas space through a conduit to a gas sparger 10 arranged in the close vicinity of the bottom of the oxygenation tank 1, preferably 1/10 of the basin height. Exhaust gas is withdrawn through a valve-controlled exhaust conduit 11. The process is conducted in such a way that rising gas bubbles of the aeration gas create sufficient buoyancy for the carrier particles to maintain the biomass-laden matter particles 13 in suspension, the specific gravity of these particles being generally only slightly above the specific gravity of the liquid, e.g 1.05 to 1.1 g/l. In order to achieve maximum thorough intermixing and a good mass transfer, a recirculating device 12, comprising, for example, a simple agitator with electric motor drive mechanisms, is arranged directly above the gas sparger 10. This mechanism is conventional and known to those skilled in the art.

As an alternative to the arrangement of the feed conduit 9 for the treatment gas illustrated in the figure, there is also the possibility of connecting a gas feed conduit directly at the bottom of the oxygenation tank 5 by means of various different connecting arrangements of a conventional nature, and to produce in this manner an additional, upwardly directed gas flow. Furthermore, the wastewater inlet 2 can have several connections distributed throughout the bottom of the tank to also provide in the oxygenation tank an upwardly oriented liquid flow.

Since 1 m³ of foam carrier material is capable of absorbing and binding more than 30 kg of biological solids, the volumes of the oxygenation tank 1 and of the post clarification stage 5 can be reduced related to the tank volume required in conventional oxygenation processes, even when treating highly polluted wastewaters. The amount of activated sludge to be recycled from the post clarification 5 into the oxygenation tank 1 is maintained at a quantity sufficient to maintain a free activated sludge amount in the activation tank of about 0.9–9 kg/m³ preferably 3–6 kg/m³.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

In the following tables numerical data is set forth for an example of an oxygenation plant operated according to the present process, as compared to a conventional suspended sludge oxygenation plant. In addition, a comparison is also made with a carrier containing oxygenation plant employing reticular carrier materials.

|  |  | Conventional Activated Sludge Process | Process of the Invention |
| --- | --- | --- | --- |
| Quantity of Wastewater Feed | m³/h | 100 | 100 |
| Oxygenation Tank Volume | m³ | 400 | 100 |
| Polyurethane Foam Added, PUR, ($\tau$ = 40 kg/m³) | m³ | — | 40 |
| TSS (fixed) [TSS = total suspended solids] | kg/m³ | — | 15 |
| TSS (unfixed) | kg/m³ | 4 | 0.9 |
| TSS (total) | kg/m³ | 4 | 15.9 |
| Load per Unit Volume | kg/m³ · d | 2.4 | 9.5 |
| Sludge Load | kg/kg · d | 0.6 | 0.6 |
| Specific Excess Sludge Production | kg/kg | 0.7 | 0.7 |
| TSS of return sludge | kg/m³ | 12 | 10 |
| Sludge Index SVI | ml/g | 100 | 100 |
| Recycle Ratio | % | 50 | 10 |
| Comparative Sludge Volume VS = TSS · ; SVI | l/m³ | 400 | 90 |
| Surface load · $q_F$ (Permissible) | m/h | 0.75 | 3 |
| Surface Area Post Clarification Tank F | m² | 135 | 35 |
| Diameter Post Clarification Tank | m | 13.1 | 6.6 |
| Depth Post Clarification Tank | m | 10 | 5 |
| Volume Post Clarification Tank | m³ | 500 | 60 |
| Total Investment for Post Clarifying | DM | 200,000 | 50,000 |
| Investment for Oxygenation Tank (Incl. Costs for PUR Filling | DM | 150,000 | 90,000 |

|  | Process Using Reticular Sludge Carrier Without Recycle | Process of the Invention |
|---|---|---|
| BOD$_5$ | | |
| Inflow | 141.6 mg/l | 170 mg/l |
| Effluent | 77.6 mg/l | 15 mg/l |
| $\eta$BOD$_5$ | 45.2% | 91% |
| SS | | |
| Inflow | 121.9 mg/l | — |
| Effluent | 90 mg/l | <20 mg/l[3] |
| Dissolved BOD$_5$ | | |
| Inflow | — | — |
| Effluent | ≈30 mg/l[1] | <15 mg/l[3] |
| MLSS = TS$_R$ | 4.65 kg/m$^3$ | 6.2 kg/m$^3$ |
| Fixed Biomass[2] | 34.5 kg/m$^3$ | 10 kg/m$^3$ |
| Free Biomass | 0.09 kg/m$^3$ | 4.6 kg/m$^3$ |
| F/M = B$_{TS}$ | 0.93 kg/kg · d | 0.4 kg/kg · d |
| Retention Time | 0.77 h | 1.8 h |

$\eta$BOD$_5$ = efficiency of BOD$_5$ degradation
SS = suspended solids
MLSS = mixed liquor suspended solids
F/M = sludge load = sludge load = food biomass ratio As can be seen from the above examples, the process of the invention provides more efficient BOD reduction than the prior art processes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological purification of wastewater containing organic impurities, wherein the wastewater is aerated in a reactor, in the presence of activated sludge in part carried on a carrier material comprising particles of organic polymer compounds, with a gas containing molecular oxygen, and the wastewater activated sludge mixture thereafter being separated in a post-clarification stage into purified water and sludge with a partial stream of the thus-separated sludge being recycled into the reactor, the improvement comprising conducting the biological purification in the reactor in the presence of a carrier material comprising open cell macroporous particles having a specific gravity of 20–100 kg/m$^3$, a volume of 0.1–125 cm$^3$, a water absorption capacity of 30–70% after two minutes, a void ratio of 6–30 pores/cm, an air permeability of 150 to 350 l/dm$^2$/min at 10 mm water column differential pressure per 50 mm of thickness, and having open macropores of 0.1–3 mm, said reactor being a continuous flow-stirred tank with carrier particles present in the reactor in an amount comprising a volume proportion of 5–40% of the reactor volume to permit substantially free movement of the carrier particles suspended in the wastewater, to achieve decentralized growth of the organisms in the activated sludge on the particles and maintaining a solids concentration in the reactor of 6–15 g/l, sparging gas bubbles into the reactor from the bottom thereof to achieve circulation of the particles throughout the reactor, and recycling separated sludge from the post-clarification stage in an amount sufficient to maintain 0.9–9 kg/m$^3$ of free activated sludge in the reactor.

2. A process as in claim 1 wherein the volume proportion of carrier in the reactor is 20–30% of the reactor volume.

3. A process as in claim 1 wherein the BOD$_5$ load in the reactor is higher than 3 kg/m$^3$d and wherein the carrier particles employed have a pore size of 1.2–1.8 mm.

4. A process as in claim 1 wherein the carrier particles employed are of open cell polyethylene.

5. A process as in claim 1 wherein the carrier particles employed are of open cell polyurethane.

6. A process as in claim 1 wherein the carrier particles employed have a void ratio of 10–20 pores/cm.

7. A process as in claim 1 wherein the amount of sludge recycled is sufficient to maintain 3–6 kg/m$^3$ of free activated sludge in the reactor.

8. A process as in claim 1 further comprising employing as the carrier material open cell soft polyurethane foam particles of the type wherein 1 cubic meter thereof is capable of absorbing and binding at least 30 kg of biological solids in said foam filling about 40% of the reactor volume whereby the solids concentration achieved is about 15 g/l.

9. A process as in claim 1 further comprising employing as the carrier material open cell soft polyethylene foam particles of the type wherein 1 cubic meter thereof is capable of absorbing and binding at least 30 kg of biological solids in said foam filling about 40% of the reactor volume whereby the solids concentration achieved is about 15 g/l.

10. A process as in claim 1 further comprising increasing the oxygen transfer efficiency of the process by applying activated carbon to the carrier material before the wastewater is conducted through the reactor thereby effecting adsorption/desorption of the oxygen by the activated carbon when wastewater is conducted through the reactor.

11. A process as in claim 1 further comprising passing only treated wastewater activated sludge mixture to the post-clarification stage while retaining said carrier in the reactor.

12. A process as in claim 1 wherein the carrier particles have a water absorption capacity of 50–70% after two minutes.

13. In an apparatus for conducting a process for the biological purification of wastewater, said apparatus comprising a reactor filled with a carrier material, the reactor having an inlet for wastewater, and an outlet connected to a post-clarification stage having a purified water discharge and a sludge recycle discharge, the improvement comprising, in use, the reactor being a continuous flow-stirred tank with carrier particles present in the reactor in an amount comprising a volume proportion of 5–40% of the reactor volume for permitting substantially free movement of the carrier particles suspended in wastewater contained in the reactor and achieving a decentralized growth of the organisms in activated sludge on the particles with a solids concentration in the reactor of 6–15 g/l, said carrier material being open cell macroporous particles having a specific gravity of 20–100 kg/m$^3$, a volume of 0.1–125 cm$^3$, a water absorption capacity of 30–70% after two minutes, a void ratio of 6–30 pores/cm, an air permeability of 150 to 350 l/dm$^2$/min at 10 mm water column differential pressure per 50 mm of thickness, and open macropores of 0.1–3 mm, gas sparging means constructed and positioned for sparging gas bubbles into the reactor from the bottom thereof to achieve circulation of the particles through the reactor, recycling means for recycling separated sludge from the post-clarification stage for maintaining a predetermined amount of free activated sludge in the reactor, and 0.9–9 kg/m$^3$ of free activated sludge in the reactor, said 0.9–9 kg/m$^3$ being said predetermined amount.

* * * * *